(12) United States Patent
Yoshinaka

(10) Patent No.: US 6,203,092 B1
(45) Date of Patent: Mar. 20, 2001

(54) ASSEMBLY OF INTERIOR PARTS AT FRONT PORTION OF AUTOMOBILE

(75) Inventor: Katsunori Yoshinaka, Saitama (JP)

(73) Assignee: Moriroku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/199,332

(22) Filed: Nov. 25, 1998

(30) Foreign Application Priority Data

Dec. 1, 1997 (JP) .................................................. 9-330011

(51) Int. Cl.$^7$ .................................................. B62D 25/14
(52) U.S. Cl. .................................. 296/70; 296/208; 180/90
(58) Field of Search .............................. 296/190.09, 70, 296/194, 208, 203.02; 180/90; 454/127; 280/779

(56) References Cited

U.S. PATENT DOCUMENTS

| | | | |
|---|---|---|---|
| 5,556,153 | * 9/1996 | Kelman et al. | ......................... 296/70 |
| 5,685,598 | * 11/1997 | Inoue et al. | ......................... 296/70 X |
| 5,979,965 | * 4/1999 | Nishijima et al. | ...................... 296/70 |
| 5,997,078 | * 12/1999 | Beck et al. | ......................... 296/70 X |

FOREIGN PATENT DOCUMENTS 8-58431    3/1996    (JP) .

* cited by examiner

Primary Examiner—D. Glenn Dayoan
Assistant Examiner—Jason Morrow
(74) Attorney, Agent, or Firm—Arent Fox Kintner Plotkin & Kahn, PLLC

(57) ABSTRACT

A support boss made of a synthetic resin is integrally formed on an air conditioning duct made of a synthetic resin and coupled to a steering hanger member in an automobile so as to cover the steering hanger member. An instrument panel made of a synthetic resin is welded or bonded to the air conditioning duct. Thus, an assembly of interior parts at a front portion of the automobile, including the steering hanger member, and the air conditioning duct and the instrument panel which are supported on the steering hanger member, can be formed without use of threaded members, or with a decreased number of threaded members used.

9 Claims, 4 Drawing Sheets

ASSEMBLY OF INTERIOR PARTS AT FRONT PORTION OF AUTOMOBILE

BACKGROUND OF THE INVENTION

1. Field of the Invention

The present invention relates to an assembly of interior parts at a front portion of an automobile, comprising a steering hanger member which is connected at opposite ends thereof to left and right front pillars of a vehicle body to support a steering column, and an air conditioning duct and an instrument panel which are supported on the steering hanger member.

2. Description of the Related Art

Such a conventional assembly of interior parts at a front portion of an automobile is formed by sequentially screwing an air conditioning duct and an instrument panel to a steering hanger member, for example, as disclosed in Japanese Patent Application Laid-open No.8-58431.

In the assembly of interior parts formed by screwing the air conditioning duct and the instrument panel to the steering hanger member in the above manner, a large number of threaded members are required, and moreover, the number of assembling steps is increased. Therefore, the reduction in cost is limited.

Accordingly, it is an object of the present invention to provide an inexpensive assembly of interior parts at a front portion of an automobile, wherein no threaded member is required, or the use of threaded members can be remarkably decreased, and the number of assembling steps is small.

SUMMARY OF THE INVENTION

To achieve the above object, according to a first aspect and feature of the present invention, there is provided an assembly of interior parts at a front portion of an automobile, comprising a steering hanger member which is connected at opposite ends there of to left and right front pillars of a vehicle body to support a steering column, and an air conditioning duct and an instrument panel which are supported on the steering hanger member, wherein the air conditioning duct made of a synthetic resin has a support boss made of a synthetic resin which is integrally formed thereon and coupled to the steering hanger member so as to cover the steering hanger member, and the instrument panel made of a synthetic resin is welded or bonded to the air conditioning duct.

With the first feature, the assembly of interior parts at the front portion of the automobile can be provided without use of threaded members, or with a remarkably decreased number of threaded members used, by the formation of and the coupling of the air conditioning duct to the steering hanger member and by the welding or bonding of the instrument panel to the air conditioning duct. Moreover, the steering hanger member, the air conditioning duct and the instrument panel reinforce one another, thereby enhancing the strength of the interior part assembly and at the same time, contributing to enhancements in rigidity between the left and right front pillars of the vehicle body and the supported rigidity of the steering column.

According to a second aspect and feature of the present invention, in addition to the first feature, the instrument panel is formed by coating a skin of a synthetic resin to a surface of a panel body made of a synthetic resin foam, and the air conditioning duct made of the synthetic resin foam having a compatibility with the panel body is welded to the panel body.

With the second feature, the welding of the instrument panel and the air conditioning duct can simply and reliably be performed, and the air conditioning duct having an excellent heat-insulating property can be provided.

According to a third aspect and feature of the present invention, in addition to the second feature, air-conditioning air passage means are defined between opposed surfaces of the panel body of the instrument panel and the air conditioning duct.

With the third feature, the instrument panel also serves as an air conditioning duct element, whereby the structure of the air conditioning duct having the plurality of air passage means can be simplified.

The above and other objects, features and advantages of the invention will become apparent from the following description of the preferred embodiment taken in conjunction with the accompanying drawings.

DETAILED DESCIPTION OF THE PREFERRED EMBODIMENTS

The present invention will now be described by way of an embodiment with reference to the accompanying drawings.

Figure 1:
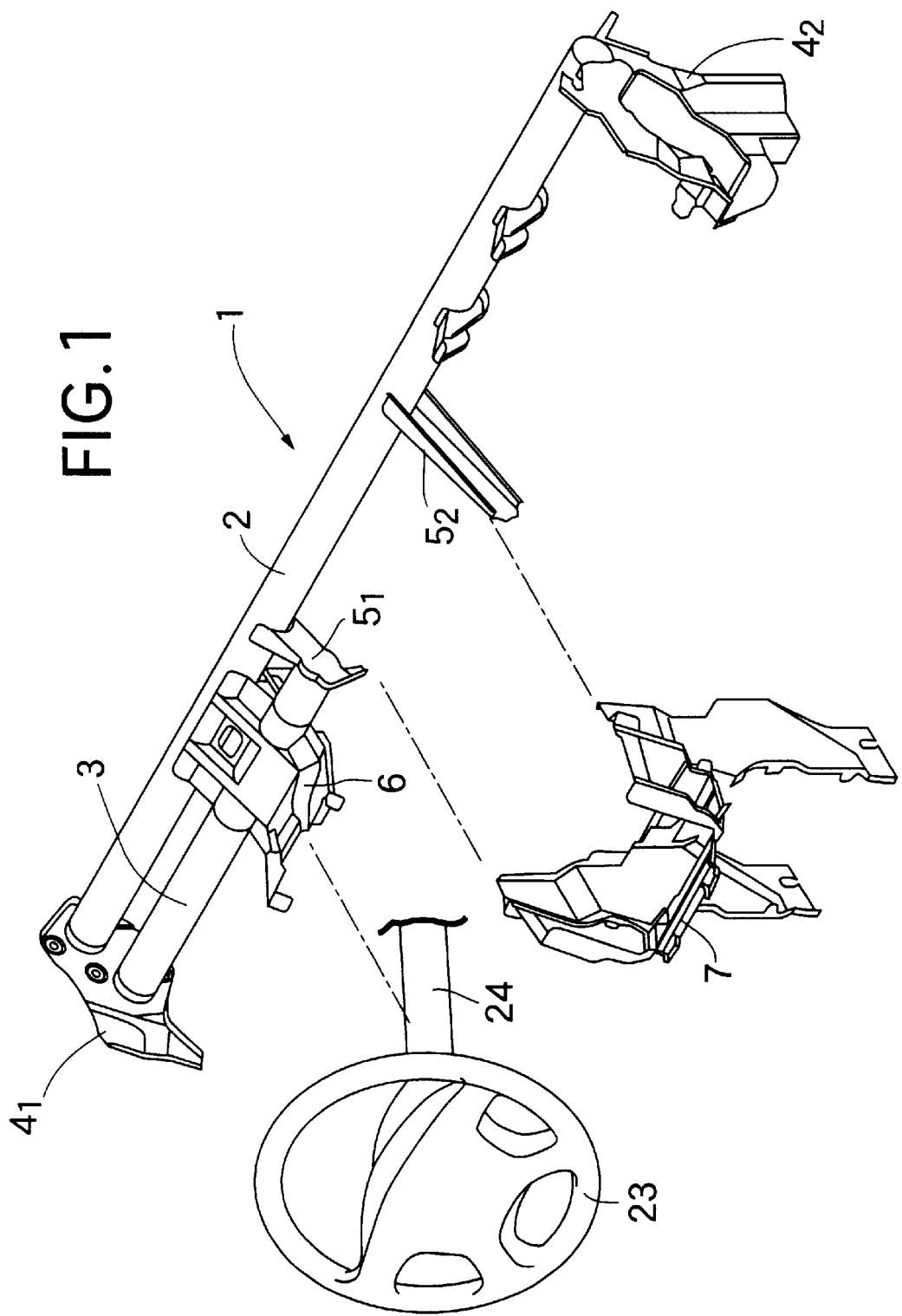
FIG. 1 is a perspective view of a steering hanger member which is an element of an assembly of interior parts at a front portion of an automobile.
Figure 2:
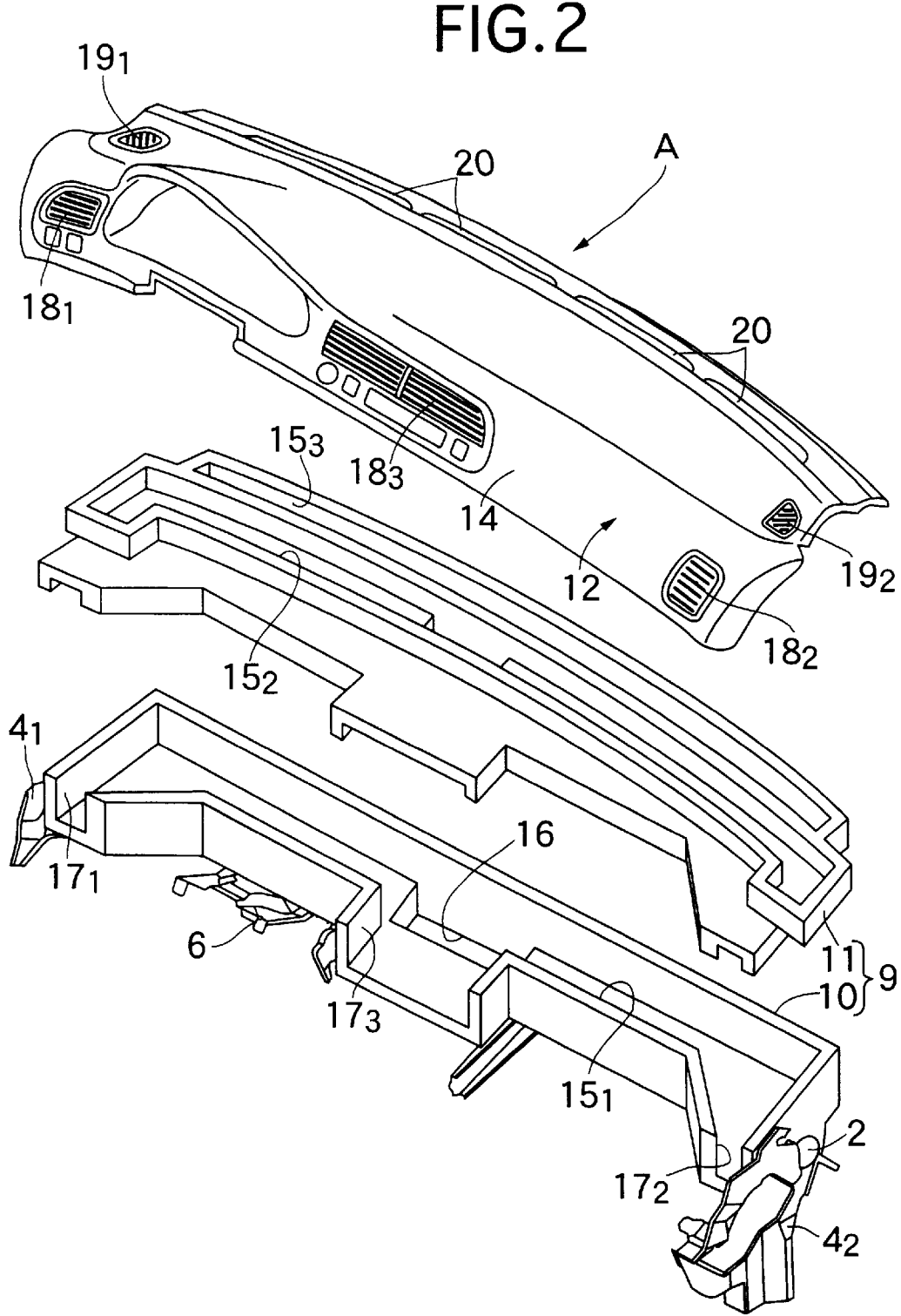
FIG. 2 is an exploded perspective view of an air conditioning duct and an instrument panel to which the steering hanger member is coupled.

Referring first to FIGS. 1 and 2, an assembly A of interior parts at a front portion of an automobile includes a steering hanger member 1, an air conditioning duct 9 and an instrument panel 12. The steering hanger member 1 comprises a longer hanger beam 2 made of a steel pipe, a pair of left and right side brackets $4_1$ and $4_2$ welded to opposite ends of the longer hanger beam 2, a shorter hanger beam 3 welded to at its one end to the left side bracket 41 and disposed in parallel to the longer hanger beam 2, a left intermediate stay $5_1$ which connects the other end of the shorter hanger beam 3 to an intermediate portion of the longer hanger beam 2, a right intermediate stay $5_2$ which is coupled to the longer hanger beam 2, so that it is opposed to the left intermediate stay $5_1$, and a column mounting bracket 6 which connects an intermediate portion of the shorter hanger beam 3 to the longer hanger beam 2. The left and right side brackets $4_1$ and $4_2$ are bolted to left and right front pillars (not shown) of the vehicle body, respectively. A steering column 24 supporting a steering wheel 23 is mounted to the column mounting bracket 6, and a console box mounting bracket 7 is secured to the intermediate stays $5_1$ and $5_2$.

Figure 3:
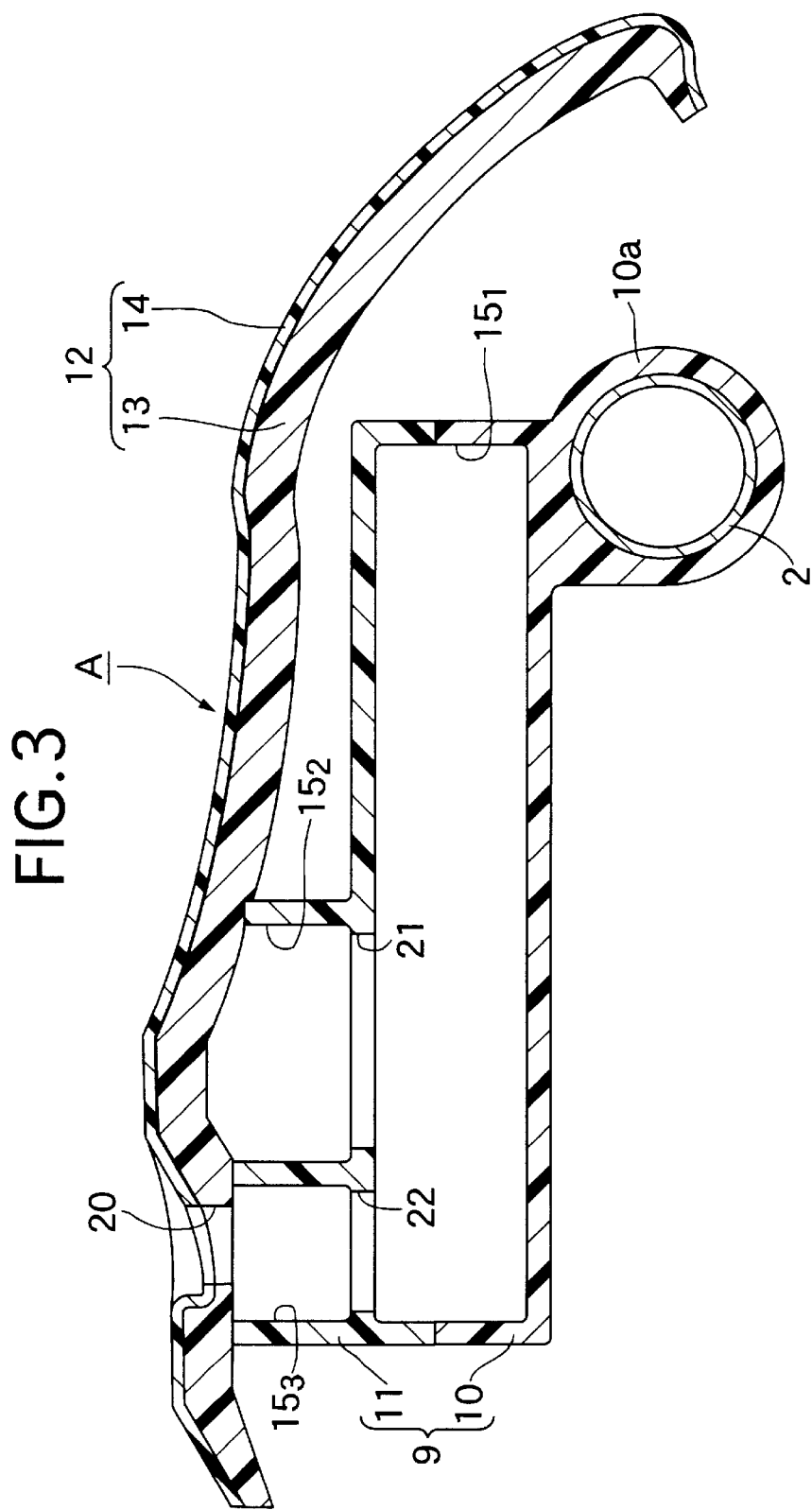
FIG. 3 is a cross sectional view of the air conditioning duct coupled to the steering hanger member.

As shown in FIGS. 2 and 3, the air conditioning duct 9 is comprised of a lower duct element 10 made of a synthetic resin foam, and an upper duct element 11 also made of a synthetic resin foam and bonded to an upper surface of the lower duct element 10. A support boss 10a is integrally formed on the lower duct element 10 from the same material, and coupled to outer peripheral surfaces of the longer and shorter hanger beams 2 and 3 to cover such outer peripheral surfaces over the substantially entire lengths of the longer and shorter hanger beams 2 and 3 of the steering hanger member 1.

The synthetic resin foams forming the lower and upper duct elements 10 and 11 have a compatibility with each other.

The instrument panel 12 is comprised of a panel body 13 made of a synthetic resin foam which is compatible with the upper duct element 11, and a crimped skin 14 of a synthetic resin bonded to a surface of the panel body 13. Specifically, all the synthetic resin foams are made of, for example, a material of olefinic polypropylene (PP). The lower duct element 10 and the upper duct element 11, as well as the upper duct element 11 and the panel body 13 of the instrument panel 12 are welded to each other by ultrasonic wave.

The lower and upper duct elements 10 and 11 define a first air passage $15_1$ extending laterally between the elements 10 and 11, and three outlets $17_1$, $17_2$ and $17_3$ protruding from a first air passage $15_1$ toward a vehicle compartment. An inlet 16 is defined in the lower duct element 10 and opens into a central portion of the first air passage $15_1$.

The upper duct element 11 and the panel body 13 define a second air passage $15_2$ and a third air passage $15_3$ which extend laterally between the upper duct element 11 and the panel body 13. Through-bores 21 and 22 are provided in the upper duct element 11 and communicate between the first air passage $15_1$ and the second air passage $15_2$, and between the first air passage $15_1$ and the third air passage $15_3$.

The instrument panel 12 is provided with three front blow-out bores $18_1$, $18_2$ and $18_3$ connected to the three outlets $17_1$, $17_2$ and $17_3$, a pair of left and right side blow-out bores $19_1$ and $19_2$ communicating with opposite ends of the second air passage $15_2$, and a plurality of upper blow-out bores 20 which open from the third air passage $15_3$ toward an inner surface of a front window shield (not shown).

The operation of this embodiment will be described below.

As described above, the support boss 10a of the lower duct element 10 is formed on the outer peripheral surfaces of the longer and shorter hanger beams 2 and 3 of the steering hanger member 1; the upper duct element 11 is welded to the lower duct element 10, and the panel body 13 of the instrument panel 12 is sequentially welded to the upper duct element 11. Therefore, the air conditioning duct 9 and the instrument panel 12 can be supported on the steering hanger member 1 without use of threaded members, or with a remarkably decreased number of threaded members used. Therefore, the number of steps of assembling the interior part assembly A is remarkably decreased, thereby bringing about a reduction in cost.

Moreover, because the support boss 10a of the lower duct element 10 is coupled to the longer and shorter hanger beams 2 and 3 of the steering hanger member 1 over the substantially entire lengths of the longer and shorter hanger beams 2 and 3, the air conditioning duct 9 and the instrument panel 12 can effectively be reinforced with the steering hanger member 1, and the rigidity of the steering hanger member 1 is also enhanced by the air conditioning duct 9 and the instrument panel 12. As a result, the rigidity between the left and right front pillars of the vehicle body and the supported rigidity of the steering column 24 can effectively be enhanced.

A test showed that when a polypropylene (PP) foam having an expansion ratio of 5 and a thickness of 5 mm was applied to a steel pipe having an outside diameter of 60 mm and a thickness of 1.6 mm, the rigidity of the steel pipe could be increased by 10%, as compared with a steel pipe to which such a coating was not applied.

Particularly, the support boss 10a can achieve a large thickness, as compared with a non-foamed synthetic resin of the same quality and the same weight. Therefore, when the support boss 10a is applied to the outer peripheral surfaces of the longer and shorter hanger beams 2 and 3, a large outside diameter can be provided to the support boss 10a, thereby increasing the sectional factor of the support boss 10a and effectively enhancing the rigidity of the longer and shorter hanger beams 2 and 3.

Moreover, the support boss 10a has a far smaller specific gravity than that of the steel pipe and hence, an increase in weight due to the application of the support boss 10a is less, as compared with a case where the outside diameter and the thickness of the steel pipe forming the longer and shorter hanger beams 2 and 3 are increased.

In addition, the instrument panel 12 define the second and third air passages $15_2$ and $15_3$ between opposed surfaces of the instrument panel 12 and the upper duct element 11 welded to the panel body 13 and hence, also serves as a duct element forming a pair with the upper duct element 11, which can contribute to simplification of the structure of the air conditioning duct having the plurality of air passages.

Further, the panel body 13 of the instrument panel 12 and the upper and lower duct elements 11 and 10 are formed of the synthetic resin foams having a compatibility with one another. Therefore, the welding of them can simply and reliably be performed and it is possible to provide the air conditioning duct having an excellent heat-insulating property at a low cost.

Thus, if an air feeding duct of an air conditioner is connected to the inlet 16 and the air conditioner is operated, cold air or warm air can be allowed to flow from the inlet 16 into the first, second and third air passages $15_1$, $15_2$ and $15_3$ and can be blown from the blow-out bores $18_1$, $18_2$, $18_3$; $19_1$, $19_2$ and 20.

Figure 4:
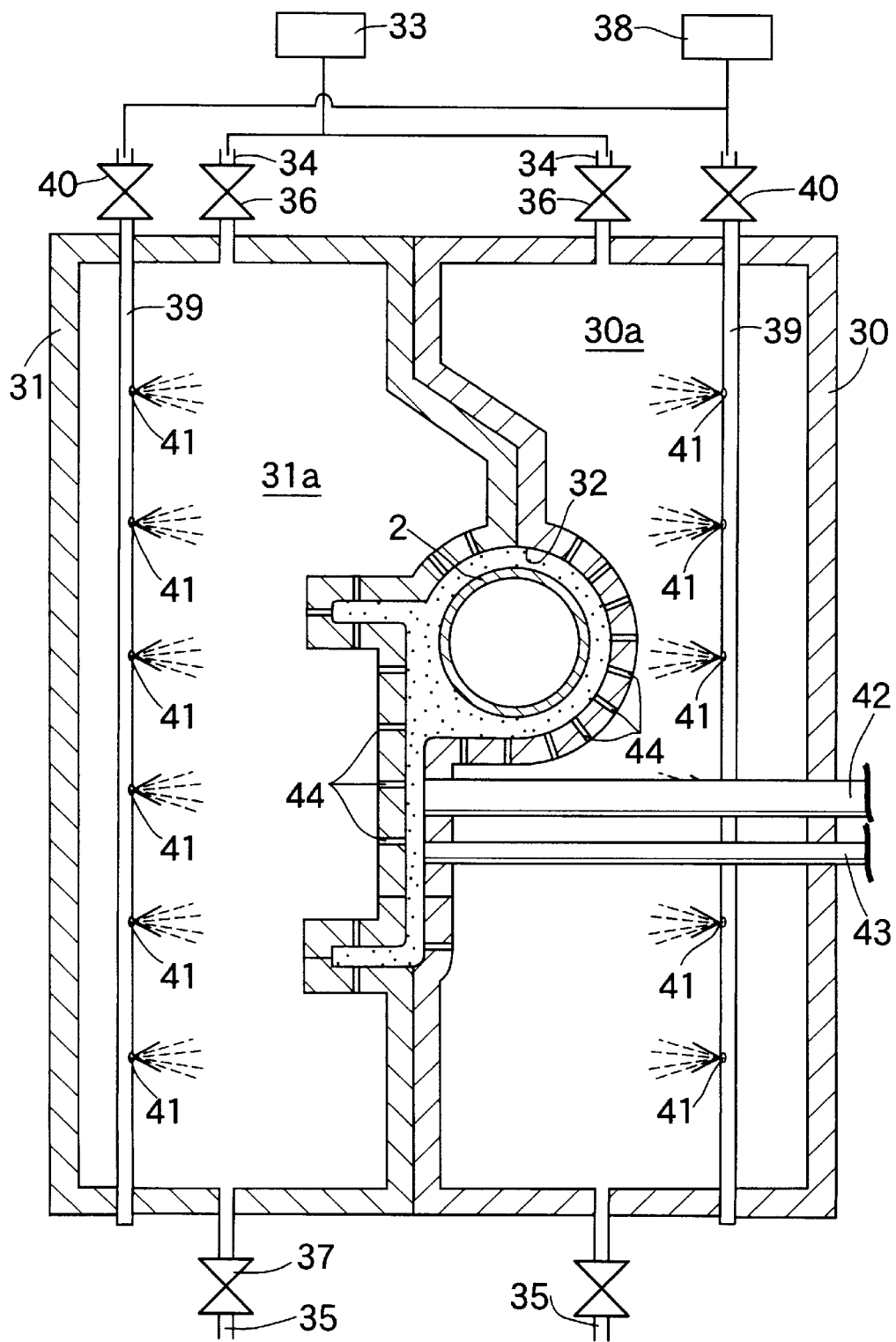
FIG. 4 is a sectional view of a molding apparatus for forming a lower duct element of the air conditioning duct by molding.

A process for forming the lower duct element 10 and a process for coupling the lower duct element 10 to the steering hanger member 1 will be described with reference to FIG. 4.

For the purpose of the forming and coupling of the lower duct element 10, a stationery die 30 and a movable die 31 which are capable of being opened and closed relative to each other, are prepared. The dies 30 and 31, when being closed, define a cavity 32 therebetween, which is put into the forming of the support boss 10a and the lower duct element 10. Each of the dies 30 and 31 is hollow, and a large number of fine bores 44 are provided in the dies 30 and 31 for communicating between hollow insides 30a and 31a of the dies 30 and 31 and the cavity 32.

A vapor introducing pipe 34 connected to a vapor generating device 33 and a discharge pipe 35 are connected to the hollow insides 30a and 31a. An inlet valve 36 and an outlet valve 37 are provided in the vapor introducing pipe 34 and the discharge pipe 35, respectively. A cooling water pipe 39 is disposed in each of the hollow insides 30a and 31a and connected to a cooling water supply device 38. The cooling water pipe 39 includes an on-off valve 40 provided at its upstream portion, and a large number of nozzles 41 which are provided within the hollow insides 30a and 31a and which open toward the cavity 32.

The stationary die 30 is provided with an injector 42 for supplying previously foamed beads into the cavity 32, and a push-out pin 43 for releasing a molded product from the stationary die.

To carry out the molding, the longer and shorter hanger beams 2 and 3 (not shown in FIG. 4), which are passed through a predetermined area of the cavity 32, while closing the dies 30 and 31, are first clamped between the dies 30 and 31, and previously foamed beads of a synthetic resin are supplied from the injector 42 into the cavity 32. Then, the inlet valve 36 in the vapor introducing pipe 34 is opened to supply water vapor of a high temperature into the hollow insides 30a and 31a in the dies 30 and 31, thereby injecting the water vapor through the large number of fine bores 44 into the cavity 32. This causes the previously foamed beads within the cavity 32 to be heated and expanded to fill the cavity 32. Thus, the support boss 10a and the lower duct element 10 are formed, and at the same time, the support boss 10a is applied to the outer peripheral surfaces of the longer and shorter hanger beams 2 and 3.

After the lapse of a predetermined expanding time, the inlet valve 36 is closed, and the outlet valve 37 in the discharge pipe 35 and the on-off valve 40 in the cooling water pipe 39 are opened to inject cooling water from the large number of nozzles 41 in the cooling water pipe 39 toward the cavity 32, thereby cooling the dies 30 and 31 around the cavity 32 and a molded product. After the cooling, the opening of the dies is carried out, and the push-out pin 43 is operated, thereby removing the molded product.

The present invention is not limited to the above-described embodiment, and various modifications may be made in a scope without departing from the subject matter of the present invention. For example, the lower duct element 10 and the upper duct element 11 can be formed integrally with each other.

What is claimed is:

1. An assembly of interior parts at a front portion of a vehicle body of an automobile, comprising:
a steering hanger member connected at opposite ends thereof to left and right front pillars of the vehicle body to support a steering column; and
an air conditioning duct and an instrument panel which are supported on said steering hanger member, wherein said air conditioning duct is made of a synthetic resin and has a support boss made of a synthetic resin, said support boss is integrally formed by molding on said air conditioning duct and is coupled to a whole outer peripheral surface of said steering hanger member over a longitudinal length of said air conditioning duct so as to enclose the steering hanger member, wherein said instrument panel is made of a second synthetic resin and is welded or bonded to said air conditioning duct, whereby integral formation of said air conditioning duct and said instrument panel with said steering hanger member acts to reinforce said air conditioning duct, said instrument panel and said steering hanger member with one another.

2. An assembly of interior parts at a front portion of an automobile according to claim 1, wherein said instrument panel is formed by coating a skin of the synthetic resin to a surface of a panel body of said instrument panel that is made of the synthetic resin.

3. An assembly of interior parts at a front portion of an automobile according to claim 2, further including air-conditioning air passage means defined between opposed surfaces of the panel body of the instrument panel and the air conditioning duct.

4. The assembly according to claim 1, further comprising a second steering hanger member that is shorter than said first steering hanger member.

5. The assembly according to claim 4, further comprising a column mounting bracket that connects an intermediate portion of said second steering hanger member to said first steering hanger member.

6. The assembly according to claim 2, wherein said synthetic resin of said air conditioning duct is compatible with said synthetic resin of said panel body.

7. The assembly according to claim 6, wherein said synthetic resin comprises olefinic polypropylene.

8. The assembly according to claim 4, wherein said support boss is coupled to said first and second steering hanger members over a substantially entire length of said first and second steering hanger members to reinforce said air conditioning duct and said instrument panel.

9. The assembly according to claim 7, wherein said olefinic polypropylene has an expansion ratio of 5 and a thickness of 5 mm.

* * * * *